United States Patent [19]

Pelczynski

[11] Patent Number: 4,604,806
[45] Date of Patent: Aug. 12, 1986

[54] POWERED DRUM OPENER WITH CUTTER WHEEL

[75] Inventor: John F. Pelczynski, Greenfield, Wis.

[73] Assignee: Hydro-Thermal Corp., Milwaukee, Wis.

[21] Appl. No.: 633,011

[22] Filed: Jul. 20, 1984

[51] Int. Cl.$^4$ .............................................. B23D 21/04
[52] U.S. Cl. .......................................... 30/417; 30/97
[58] Field of Search .................... 30/97, 102, 101, 95, 30/418, 424, 426, 433, 435, 417, 425, 427

[56] References Cited

U.S. PATENT DOCUMENTS 3,110,962 11/1963 Krist et al. ............................. 30/418
3,129,509 4/1964 McLean ................................. 30/426

OTHER PUBLICATIONS

Gilco Equipment Catalogue L. & M. Gilbert Co., 422 Bourse Blvd., Phila. PA 3/8/1963.

*Primary Examiner*—Douglas D. Watts
*Attorney, Agent, or Firm*—Andrus, Sceales, Starke & Sawall

[57] ABSTRACT

A drum opener for severing a metal clamping band on a drum to enable the cover to be removed from the drum. The drum includes a cylindrical metal wall having a plastic liner and the upper edge of the wall and liner are rolled outwardly along with the peripheral edge of the cover to form a chime. A metal clamping band is secured around the chime to seal the cover to the drum. The drum opener includes a base which supports a power source such as an electric gear motor and a drive wheel is journaled on the base and is disposed to engage the upper portion of the clamping band. A rotatable cutter is disposed in engagement with the lower portion of the band and is out of direct alignment with the drive wheel. The cutter can be manually adjusted to bring the cutter into engagement with the clamping band. To prevent twisting of the opener during operation, a pair of arms or outriggers extend outwardly in opposite directions from the base and guide members are positioned on the ends of the arms and are disposed to ride on the clamping band as the opener is moved in its path around the drum by operation of the drive wheel.

8 Claims, 4 Drawing Figures

U.S. Patent  Aug. 12, 1986  4,604,806
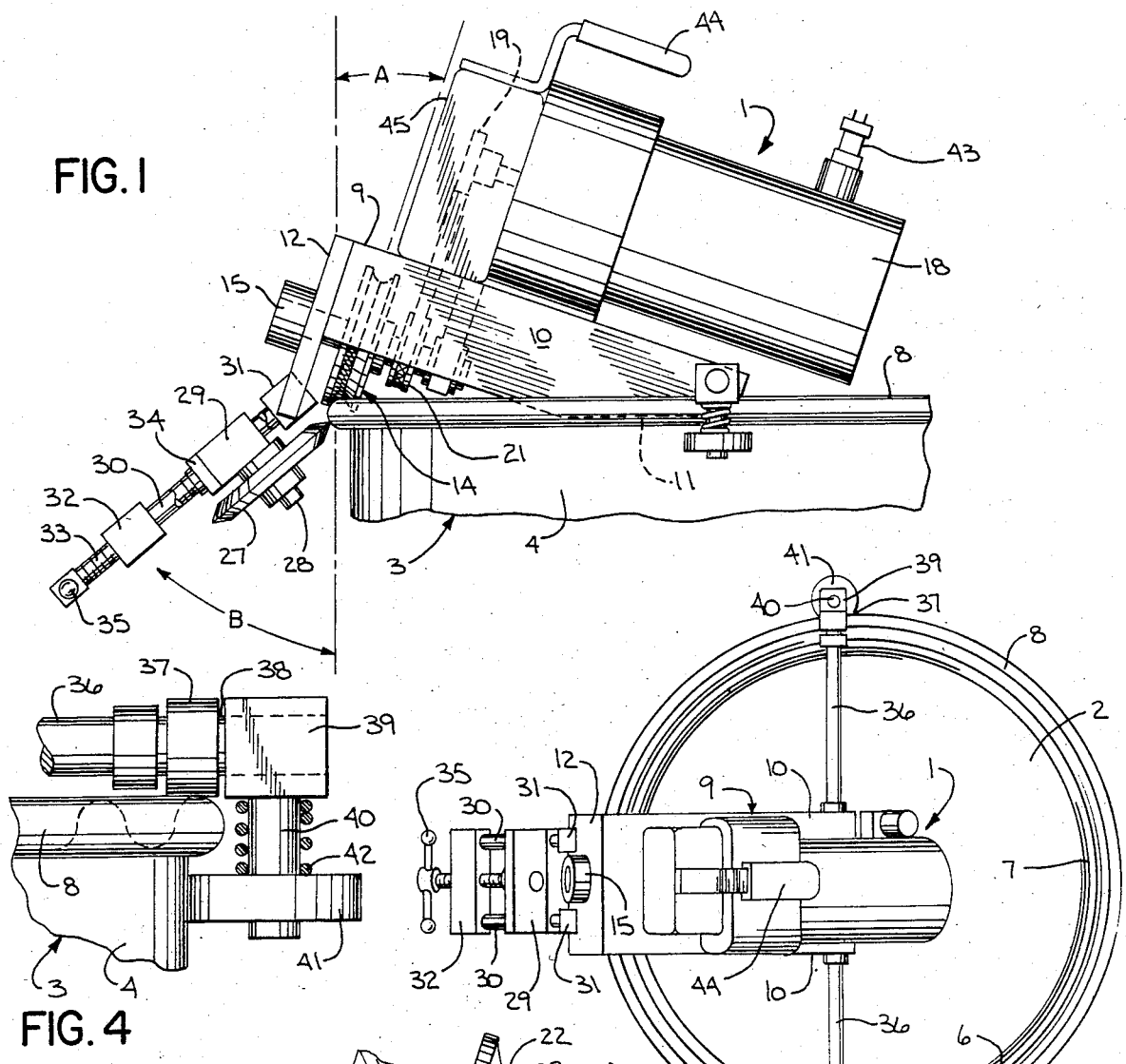
FIG. 1
FIG. 2
FIG. 4
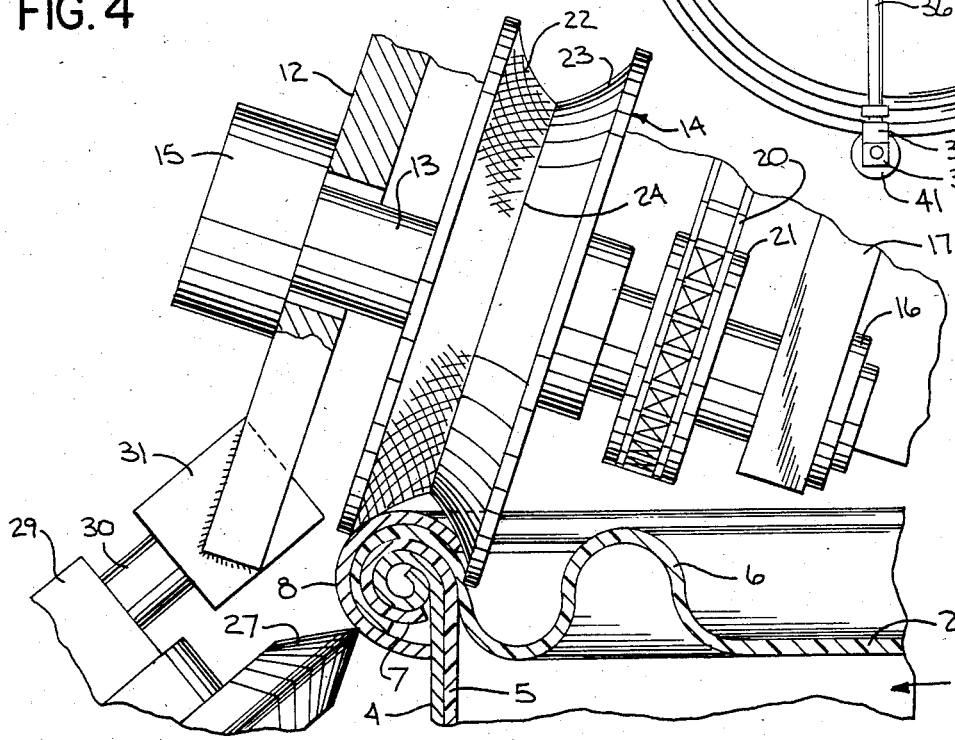
FIG. 3

POWERED DRUM OPENER WITH CUTTER WHEEL

BACKGROUND OF THE INVENTION

Large industrial drums normally include a cover that is secured to the edge of the cylindrical wall of the drum by a rolled chime. At the location of use, the cover is normally removed by a power operated drum opener.

In one type of drum opener a drive wheel is engaged with the upper edge of the chime, while a cutter wheel is located directly opposite the drive wheel and is engaged with the lower edge of the chime. Operation of the drive wheel will cause the opener to travel around the upper end of the drum and the cutter will cut the chime to release the cover.

Drums used for the shipment of chemical materials have been designed with a plastic liner to protect the metal drum from the corrosive effect of the chemical materials. In drums of this type, the upper edge of the drum and the plastic linear are rolled outwardly and engaged by the rolled peripheral edge of the cover to form a chime. A metal clamping band is then clamped over the chime to provide a sealed attachment between the cover and the drum.

As plastic lined drums are relatively expensive, it is desirable to remove the cover in a manner that will not cause damage to either the drum, the cover, or the plastic liner, so that the drum can be reconditioned for re-use. Conventional drum openers have not been found suitable for cutting of the metal clamping band of plastic lined drums.

SUMMARY OF THE INVENTION

The invention is directed to an improved drum opener that is capable of cutting the metal clamping band used with plastic lined drums so that the cover can be removed without damage to either the cover, the drum or the plastic liner.

In accordance with the invention, the opener includes a base or frame which supports a drive mechanism such as an electric motor. A drive wheel is journaled on the base and is positioned at an angle of about 15° to 20° from the vertical and rides against the upper portion of the metal clamping band. A rotatable cutter is journaled on an adjustable bracket and is located at an angle of about 40° to 60° with respect to the vertical and engages the lower portion of the clamping band.

Operation of the drive wheel will cause the opener to travel around the drum and the cutter will cut or sever the clamping band during travel of the opener.

As the drive wheel and cutter are not in direct alignment, there is a tendency for the opener to twist during operation. To compensate for this twisting action, a pair of arms or outriggers extend outwardly in opposite directions from the base. Rollers or guide members are secured to the outer ends of the arms and are adapted to ride on the upper surface of the clamping band as the drum opener travels about the drum. In addition, the outer end of each arm carries a second roller which is disposed to engaged the side wall of the drum. With this construction, twisting action during operation is eliminated.

The opener of the invention will cut and remove the metal clamping ring without damage to either the cover, the drum, or the plastic liner, so that the drum and cover can be reconditioned for reuse.

The opener includes a drive mechanism, which can either be an electric or fluid-operated motor, so that it is self-contained and requires no auxiliary drive.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation view of the drum opener of the invention as mounted on a drum;

FIG. 2 is a top plan view of the drum opener as mounted on the drum;

FIG. 3 is an enlarged vertical section showing the cutter wheel and drive wheel; and FIG. 4 is a vertical section showing the guide rollers at the end of one of the arms.

DESCRIPTION OF THE ILLUSTRATED EMBODIMENT

The drawings illustrate a drum opener 1 to be used to remove the cover 2 from a large drum 3. Drum 3 includes a generally cylindrical wall or shell 4 and a plastic liner 5 formed of polyethylene film, or the like, is disposed on the inner surface of the wall 4, as well as on the bottom of the drum.

Cover 2 is preferably formed of a molded plastic material and is provided with an annular stiffening ridge or corrugation 6, which is spaced inwardly from the periopheral edge of the cover.

As shown in FIG. 3, the upper edge of the shell 4 and plastic liner 5 are rolled outwardly, and the peripheral edge of the cover is provided with a complementary contour, so that the members form a chime or bead indicated by 7. A metal clamping band or ring 8 is clamped around the chime 7 to provide a seal between cover 2 and drum 3.

Drum opener 1 includes a base or supporting structure 9 having a pair of generally parallel legs 10. Each leg 10 is provided with a diagonal lower edge 11 which is spaced slightly above cover 5 when the opener is positioned on the drum. Base 9 also includes a plate 12 which connects the ends of legs 10, and shaft 13 which carries drive wheel 14 is journaled within a bearing assembly 15 mounted on the outer surface of plate 12.

As best illustrated in FIG. 3, the inner end of shaft 13 is journaled within bearing 16 carried by plate 17 that extends downwardly from gear motor 18.

To drive the drive wheel 14, gear motor 18 drives through a sprocket 19, and sprocket 19 is connected by chain 20 to sprocket 21 mounted on the central portion of shaft 13. Thus, operation of motor 18 acts to rotate the drive wheel 14 to move the opener in a path of travel around the periphery of the drum.

Drive wheel 14 is composed of a pair of sections 22 and 23 which are mounted in side-by-side relation and are joined at joint 24. Wheel section 22 is provided with a knurled surface which is adapted to engage the upper portion of clamping band 8 and the knurling increases the frictional resistance between section 22 and the band. The wheel section 23 is positioned to engage the inner surface of chime 7, as shown in FIG., 3, and is provided with a smooth surface. As illustrated in FIG. 1, joint 24 is located at an angle A of about 15° to 20°, and preferably about 18°, from the vertical, or in other words, the axis of shaft 13 is located at an angle of 18° from the horizontal.

Cooperating with drive wheel 14 is a cutter wheel 27. The shaft 28 of cutter wheel 27 is journaled within a block 29, as shown in FIG. 2. A pair of guide rods 30 extend through openings in opposite end of block 29 and the upper ends of guide rods 30 are connected to blocks 31 which are mounted on plate 12, while the lower ends of rods 30 are connected to bar 32.

The upper end of a threaded rod 33 is engaged with a nut 34 mounted on the lower surface of block 29 and the central portion of rod 33 is threaded within an opening in bar 32. The lower end of rod 33 carries a handle 35. With this construction, rotation of handle 35 will move the block 29 and cutter wheel 27 toward and away from chime 7.

As shown in FIG. 1, the cutter wheel 27 is located at an angle B of about 40° to 60° with respect to the vertical and preferably about 50°. Due to the fact that the drive wheel 14 and cutter wheel 27 are not in direct or opposed alignment, there is a tendency for the opener to twist during operation. To eliminate the twisting movement, the opener of the invention incorporates a guide mechanism which engages the chime 7 at spaced locations on the drum. More specifically, a pair arms 36 extend outwardly in opposite directions from legs 10. The outer end of each arm 36 carries a roller 37 which is mounted on a horizontal shaft 38 that projects from the end of each arm 36. As shown in FIG. 4, the rollers 37 are adapted to ride on the upper edge of the clamping ring 8, as the opener travels around the drum. The outer end of each shaft 38 is secured to a block 39, and a vertical shaft 40 extends downwardly from each block and carries roller 41, which is adapted to engage the outer surface of drum 3. A coil spring 42 is positioned around the shaft 40 and urges the roller 41 downwardly. This construction permits roller 41 to float on shaft 40, thereby preventing jamming due to non-uniformity of the drum and chime 7.

To provide a connection to a suitable source of electric power, a swivel connector 43 is mounted on the upper surface of motor 18.

In addition a handle 44 can be secured to the upper surface of the chain guard 45 to facilitate handling of the drum opener.

In operation, the drum opener is initially positioned to the side of the drum and the opener is then moved horizontally across the cover 2 to position the chime 7 between the rollers 37 and 41 on arms 36. With the opener properly positioned on the drum, the arms will extend along a diameter of the drum, or along a chord located in a direction from the diameter to the drive wheel 14.

With the drive wheel 14 positioned on the upper edge of the clamping ring 8, gear motor 18 is operated to rotate the drive wheel and cause the opener to move about the periphery of the drum. As the unit rotates, the operator, through manual adjustment of handle 35, will bring the cutter wheel 27 into engagement with the clamping band 8 to cut the band. As the opener revolves on the drum, the operator can continue to tighten down the cutter wheel 27, causing the cutter to take a deeper cut into the band. In certain instances, it may take several revolutions of the opener to completely sever the clamping band.

With the use of the opener of the invention, the metal clamping band 8 can be removed without damage to the drum 3, cover 2, or the plastic liner 5. This enables the drum to be reconditioned for reuse.

Various modes of carrying out the invention are contemplated as being within the scope of the following claims particularly pointing out and distinctly claiming the subject matter which is regarded as the invention.

I claim:

1. A drum opener for removing a cover from a platic lined drum, said drum including a cylindrical metal wall having a plastic liner on the inner surface of said wall, the upper edge of said wall and said liner being rolled outwardly with the peripheral edge of the cover to form a chime, and said drum including a metal clamping band clamped around the chime and extending completely around the circumference of the drum, said opener comprising a supporting structure, power means mounted on the supporting structure, rotatable drive means journaled on the supporting structure and disposed to engage the upper portion of said clamping band, means operably connecting said power means to said drive means to thereby rotate said drive means and move said opener in a path around the periphery of the drum, a rotatable cutter disposed in engagement with the lower portion of said band and disposed on the opposite side of a vertical plane extending through said drive means from said power means, said cutter being disposed out of direct alignment with said drive means, a pair of arms extending outwardly in opposite direction from the supporting structure, and guide means on the end portion of each arm and spaced circumferentially from said drive means, said guide means disposed to ride on said chime as the opener is moved in its path of travel.

2. The opener of claim 1, wherein said rotatable drive means compises a pair of drive members secured in side-by-side relation, a first of said drive members disposed to engage said clamping band and a second of said drive members disposed to engage the inwardly facing surface of said chime.

3. The opener of claim 2, wherein said first drive member is provided with surface deviations to increase the frictional resistance between said first drive member and said clamping band.

4. The opener of claim 2, wherein the outer diameter of said second drive member is greater than the outer diameter of said first drive member.

5. The opener of claim 1, wherein said rotatable drive means is disposed at an angle of about 15° to 20° with respect to the vertical and said cutter is disposed at an angle of 40° to 60° with respect to the vertical.

6. The opener of claim 5, wherein said rotatable drive means is disposed at an angle of about 18° with respect to the vertical and said cutter is disposed at an angle of about 50° with respect to the vertical.

7. The opener of claim 1, wherein said guide means includes a roller on each arm and mounted about a generally horizontal axis, said roller adapted to engage the upper portion of said clamping band.

8. The opener of claim 7, and including a second roller mounted on the end of each arm and disposed to engage the outer side wall of said drum.

* * * * *